United States Patent [19]

Stüwe et al.

[11] 4,277,115
[45] Jul. 7, 1981

[54] MOUNT FOR CALOTTE BEARINGS

[75] Inventors: Botho Stüwe; Wilhelm Vobel, both of Fürth, Fed. Rep. of Germany

[73] Assignee: Siemens Aktiengesellschaft, Berlin and Munich, Fed. Rep. of Germany

[21] Appl. No.: 86,956

[22] Filed: Oct. 22, 1979

[30] Foreign Application Priority Data

Oct. 30, 1978 [DE] Fed. Rep. of Germany ....... 2847009

[51] Int. Cl.³ .............................................. F16C 27/06
[52] U.S. Cl. .................................. 308/26; 308/DIG. 5
[58] Field of Search ................... 308/26, 72, 123, 121, 308/94, 78, DIG. 5

[56] References Cited

U.S. PATENT DOCUMENTS

| 4,139,246 | 2/1979 | Mikoshiba et al. | 308/26 |
| 4,209,872 | 7/1980 | Maier | 308/26 |
| 4,224,165 | 9/1980 | Laven et al. | 308/26 |

Primary Examiner—Lenard A. Footland
Attorney, Agent, or Firm—Kenyon & Kenyon

[57] ABSTRACT

A mount for calotte bearings in which a ring of an elastomer or of felt is disposed between the calotte bearing and a bearing support element and the calotte bearing and bearing support element are provided with grooves in the region of this ring. The calotte bearing mount is particularly useful in pumps with canned motors for delivery of electrolyte liquid in fuel cell units.

8 Claims, 2 Drawing Figures

MOUNT FOR CALOTTE BEARINGS

BACKGROUND OF THE INVENTION

This invention relates to bearing mounts in general and more particularly to a mount for calotte bearings.

In a manner similar to other bearings, calotte bearings are used for the suspension of shafts, in particular for suspending the shafts of motors and transmissions. In contrast to other bearings such as cylindrical bearings, which are rigidly installed in bearing support elements, such as housing bores, by pressing, gluing or crimping, calotte bearings are movable within the mount and and thus can adapt themselves to the position of the shaft. To this end, the housing for the seating of the calotte is made spherical or conical, so that bearing then lies with one ball half in the housing depression. By means of a spring element, a so-called clamping stay, the calotte bearing is held in its position. The clamping stay may be secured to the housing by riveting or crimping, or it may be fastened by screws or with a lock ring.

The clamping stay, which rests on the side of the calotte bearing away from the housing, spring-supported and force-locking, has the function, in addition to the axial fixation of the bearing, of preventing co-rotation of the bearing when the shaft is driven because of its force-locking contact with the bearing. At the same time, however, the ability of the bearing to rotate in aligned adjustment to the axis must be preserved. The force for the parallel adjustment of the bearing bore to the shaft must not exceed a certain value, because harmful edge forces between shaft and bearing otherwise would occur. Adjustability and hence the operation of calotte bearings therefore depends very essentially on the force exerted on the calotte by the clamping stay, which axially secures the bearing which is fitted loosely in the seating bore of equipment such as motors and pumps and prevents co-rotation and, also, in the case of electric motors reduces noise. In the practice, the adjustment of the magnitude of this force is possibly only by maintaining narrow tolerances on the spring element, on the bearing contour, and on the seating bore. Moreover, the bearing adjustment force or bearing adjustment couple must be checked regularly after installation. In addition, in the known calotte bearing mounts, for a low bearing adjustment couple, a surface of low peak-to-valley height, i.e., a smooth surface, is required at the calotte and at the seating bore. The above stated dual function of the clamping stays thus requires an exact matching and adjustment of the spring tension for which purpose a high precision clamping stay and exact housing and bearing dimensions and surfaces of little roughness are required.

SUMMARY OF THE INVENTION

It is the object of the present invention to describe a simplified mount for calotte bearings and thereby to avoid, in particular, the problems occurring with the clamping stays used up until now.

This is achieved, according to the present invention by disposing a ring of an elastomer or of felt, i.e., a compressible material, between the calotte bearing and the bearing support element, and by providing the support element and the calotte bearing with grooves in the region of the ring.

Elastomer is a collective term for synthetic and natural polymers with rubber-elastic properties (cf. for example: O.-A. Neumüller "Römpps Chemie-Lexikon", 7th edition, Franckh'sche Verlagshandlung Stuttgart, 1973, page 971). By felt is understood, in common usage, a fibrous textile produce with a random arrangement of the fibers (natural or chemical fibers).

The calotte bearing mount according to the present invention has a number of advantages:

The requirement of narrow tolerances of the component supplying the holding force is obviated, so that its manufacture is facilitated at the same time;

Easier installation; it becomes possible to use calotte bearings in inaccessible or poorly accessible places, such as slit tubes;

Reduction of the bearing adjustment forces;

Testing of the bearing adjustment forces is eliminated;

Friction between the bearing and the components supporting and immobilizing the bearing is eliminated or greatly reduced; and It can be used for carbon and plastic calotte bearings as well as for oil impregnated porous calotte bearings.

The mount according to the present invention thus fulfills not only the requirements for calotte bearing mounts generally, but it also affords a reduction of the manufacturing, installation and testing costs.

For calotte bearings of carbon or plastic, elastomer rings are used in the mount according to the present invention. For porous bearings, e.g., of iron or bronze, felt rings are used. This offers a further advantage in that the felt can serve at the same time as a reservoir for the oil or grease required for lubrication of the porous bearing.

The permanent deformation typical of elastomers (compression set), proves to be an advantage for use in the calotte bearing mount according to the present invention. In fact, the elastomer ring is pressed into the space remaining between the bearing and the bearing support element, in particular the housing wall, and adapts itself more or less to the form of this space, depending on prestress.

The resistance to this deformation decreases in the course of time, in particular under action of heat. But, as a result, the force of the bearing which it opposes to the aligning force of the shaft, and which is the cause of the tilting forces between bearing and shaft also decreases.

Apart from this, in the mount according to the present invention, the bearing adjustment force can be kept small, in any case, by an appropriate selection of the Shore hardness or, respectively, the specific gravity of the elastomer material and can be varied accordingly. Furthermore, the aligning force of the calotte bearings can be influenced by the cross section and form of the ring. Thereby the elastomer or felt ring assumes a dual function in the calotte bearing mount of the present invention, in analogy to a clamping stay. The elasticity permits alignment of the bearing parallel to the journal, while the form locking deformation secures it against rotation.

Also during installation, the mount according to the present invention proves very advantageous. The separate parts are simply plugged one into the other, and no additional operations such as screwing, riveting or crimping are necessary, such as clamping stays require. The elimination of installation work is advantageous especially in the case of canned motors with narrow slit tubes. Of further advantage in the mount of the present invention is the fact that the precision in the manufacture of the rings need only be within the limits as they exist in punching by knife cut. Moreover, rough finishing, i.e., a coarse grinding, is sufficient on this mount for producing the surface quality required for the bearing support element and for the outer edges of the calotte. By contrast, as stated before, the clamping stays used up until now are precision parts.

In the calotte bearing mount of the present invention, the bearing support element, i.e., in general the housing wall or the seating bore, and the calotte bearing, are provided with grooves. The grooves are disposed in the region of the elastomer or felt ring, that is, in the calotte bearing the actual bearing surface is smooth, while the surface region of the calotte contiguous to the ring has the grooves. The elastomer or felt ring squeezes into the grooves of the mutually opposite components, whereby the bearing is connected with the support element in a form locking manner and yet movably in a way that movements originating from the support element or from the housing do not affect the easy running of the bearing, that is, that wedging does not occur. The grooves in the bearing support element and in the calotte bearing are advantageously formed as radial grooves, i.e., arranged radially in relation to the shaft axis.

DETAILED DESCRIPTION OF THE INVENTION

Figure 1:
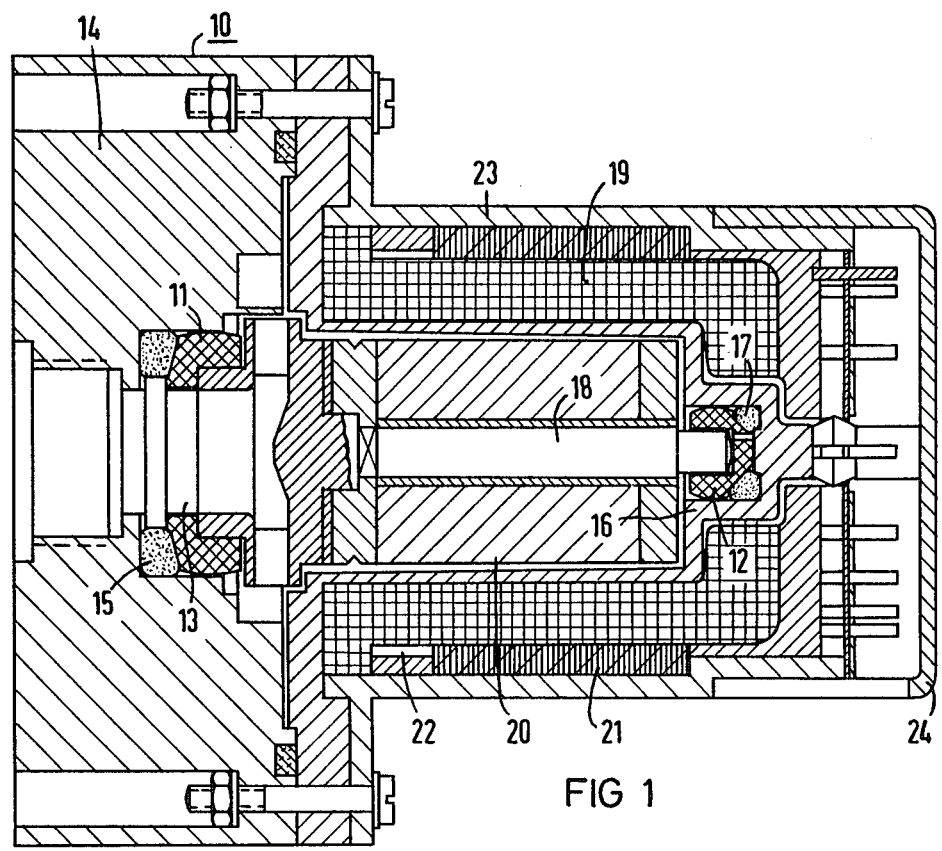
FIG. 1 shows an electrolyte feed pump equipped with calotte bearing mounts according to the present invention.

In FIG. 1 a pump with a canned motor (cf. Canadian Pat. No. 898,885 or U.S. Pat. No. 3,572,982), which is used in particular for the delivery of electrolyte liquid in electrochemical cells is shown, in section. In the present example, this pump circulates the electrolyte liquid, i.e., aqueous 6 n KOH, inside a fuel cell unit, at an electrolyte temperature of about 80° C. Here not only the pump wheel, but also the entire slit tube interior, i.e., the electric rotor and the two bearings, are swept by the potassium hydroxide. Such a design has the advantage that a dynamic shaft seal between the hydraulic and the electric sections of the pump is not necessary, this being of advantage in particular in view of the great tendency of potassium hydroxide to creep.

The pump 10 in FIG. 1 comprises two calotte step bearings 11 and 12 of carbon, the larger bearing 11 being provided with an opening 13 for the intake duct of the pump. Instead of clamping stays of conventional design, pump 10 has calotte bearing mounts according to the present invention. On the one hand, an elastomer ring 15 is arranged between the pump housing 14, i.e., the bearing support element, and the calotte bearing 11, and, on the other, an elastomer ring 17 between the slit tube 16, forming the corresponding bearing support element and the calotte bearing 12. Further, the calotte bearing 11 and the housing 14 as well as the calotte bearing 12 and the slit tube 16 are provided, in the region of the elastomer rings 15 and 17, with four radial grooves each.

The free axial internal space between tube 16 and housing 14 of pump 10 is laid out so that, with the pump rotor 18 installed, the elastomer rings 15 and 17 come to lie between the bearing on the one hand and the bearing support element i.e., the housing or slit tube, on the other with prestress and corresponding deformation. Both bearings are secured against rotation and can, with appropriate Shore hardness of the elastomer rings adjust themselves to be parallel to the axis, with small counter forces. In addition, both bearings are damped, whereby in particular when used in electric motors, the transmission of running noise caused by magnetic forces, via the armature to the bearing, can be effectively suppressed.

The bearing adjustment forces are obtained through the Shore hardness or the specific gravity. This means that the elastomer rings are only just so soft or have a Shore hardness such that form locking is ensured. Relatively small rings, therefore, are made preferably of an elastomer foam, while relatively large rings are made of a compact elastomer. In the present case the rings 15 and 17 consist of EPDM foam, i.e., of ethylene-propylene-diene terpolymer foam, which is lye-resistant. They are made of so-called moss rubber, i.e., of microcellular foam. Ring 15 has an inside diameter of 19 mm and an outside diameter of 27 mm, ring 17 an inside diameter of 7 mm and an outside diameter of 11 mm; the ring thickness is 3 mm in each case. Besides EPDM foam, the elastomer rings in relatively small equipment, and at operating temperatures up to about 35° C., may also be made, for example, of polyethylene foams. For equipment of higher outputs and torques, rubber-elastic materials of appropriate Shore hardness are used, such as EPDM rubber, chloroprene rubber, and nitrile rubber types on a butadiene-acrylic nitrile copolymer base.

In electrolyte feed pumps of the above type, no malfunctions have occurred even after many hours of temperature interval operation (between 20° and 80° C.) under operating conditions and over a period of about 1½ years, that is, neither heavy running nor wedging of the rotor shaft has occurred. This is remarkable especially because, at the operating temperature of 80° C., due to tensions in the slit tube, migration of the smaller bearing 17 in a direction radial to the longitudinal axis of rotor 18 will occur.

In the electrolyte feed pump shown in FIG. 1 the following parts are further specifically designated: 19 is the winding of a collectorless d-c canned motor, and 20 its permanent magnet, which is mounted directly on the pump rotor 18; 21 denotes the iron lamination for the magnetic flux return, and 22 one of four Hall generators for control of the drive field of the motor; lastly 23 represents the motor housing and 24 a protective cap for the electric connections of the Hall generators and of the motor winding.

Figure 2:
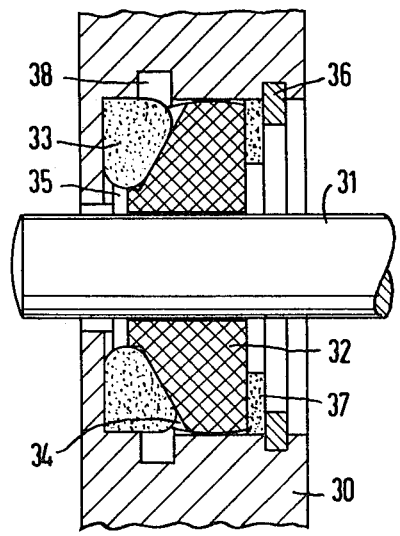
FIG. 2 illustrates another form of construction of the calotte bearing mount according to the invention.

In FIG. 2 another form of construction of the calotte bearing mount according to the present invention, namely a form which is suitable for equipment with continuous shafts, is shown, again in sections. The shaft 31 passing through the housing 30 is mounted in the calotte bearing 32. Between the calotte bearing and the housing wall an elastomer or felt ring 33 is disposed. Also, the calotte bearing 32 and housing 30 are provided with grooves 34 and 35. In this realization of the mount according to the present invention, a resilient lock ring 36, e.g., of bronze or stainless steel is provided on the side of the calotte bearing 32 away from the elastomer or felt ring 33. The lock ring 36, which is force fitted into the housing 30, brings about, in analogy to the front side of the journal in calotte step bearings, the axial fixation of the bearing.

Advantageously, another elastomer or felt ring 37 may be disposed between the calotte bearing 32 and the lock ring 36 in the realization of the calotte bearing mount of the present invention according to FIG. 2. In this way, especially in the case of larger bearing diameters, and hence larger adjustment paths of the outer bearing edge, the friction of the bearing edge on the lock ring can be avoided. Moreover, the damping of the bearing, in particular in electric motors, is then greater, so that bearing noise can be avoided still more reliably.

Both the realization of the mount of the present invention according to FIG. 1 and that according to FIG. 2 can be used in carbon and plastic calotte bearings as well as in porous calotte bearings. For the latter, one then uses felt rings instead of elastomer rings. Expediently one uses oil impregnated felt rings, so that the felt ring serves not only for axial and rotational stability but also as an oil supply for the oil-impregnated porous bearings. In this case an annular groove 38 serving as a reservoir chamber for the lubricant may also advantageously be provided in the housing 30.

What is claimed is:

1. An improved mount for calotte bearings which are disposed opposite a bearing support element comprising:
   (a) a ring of an elastomer or of felt disposed between the calotte bearing and the bearing support element; and
   (b) grooves in the support element and the calotte bearing in the region of said ring.

2. A mount according to claim 1 wherein said bearing support element and calotte bearing are provided with radial grooves.

3. A mount according to claim 1 or 2 and further including a lock ring on the side of the calotte bearing away from the elastomer or felt ring.

4. A mount according to claim 3 and further including a further elastomer or felt ring between the calotte bearing and the lock ring.

5. A mount according to claim 4 wherein said elastomer or felt rings consist of a foam type elastomer.

6. A mount according to claim 5, wherein said elastomer ring consists of EPDM foam (ethylene-propylene-diene terpolymer).

7. A mount according to claim 1 wherein said elastomer or felt rings consist of a foam type elastomer.

8. A mount according to claim 7 wherein said elastomer ring consists of EPDM foam (ethylene-propylene-diene terpolymer).

* * * * *